United States Patent [19]
Tsuji et al.

[11] Patent Number: 4,797,700
[45] Date of Patent: Jan. 10, 1989

[54] DIAPHRAGM DEVICE

[75] Inventors: Sadahiko Tsuji; Hiroyoshi Inaba, both of Kanagawa, Japan

[73] Assignee: Canon Kabushiki Kaisha, Tokyo, Japan

[21] Appl. No.: 878,605

[22] Filed: Jun. 26, 1986

[30] Foreign Application Priority Data

| Jun. 28, 1985 | [JP] | Japan | 60-99779[U] |
| Oct. 30, 1985 | [JP] | Japan | 60-243644[U] |
| Nov. 14, 1985 | [JP] | Japan | 60-175530[U] |
| Nov. 29, 1985 | [JP] | Japan | 60-182889[U] |

[51] Int. Cl.$^4$ .............................................. G03B 9/02
[52] U.S. Cl. .................................. 354/271.1; 354/270; 354/274
[58] Field of Search ............... 354/270, 271.1, 274, 354/228, 229, 230, 231

[56] References Cited

U.S. PATENT DOCUMENTS

| 3,928,859 | 12/1975 | Peterson | 354/228 |
| 4,096,495 | 6/1978 | Nesson et al. | 354/270 |
| 4,104,653 | 8/1978 | Johnson et al. | 354/230 |
| 4,527,876 | 7/1985 | Tanaka et al. | 354/229 |

FOREIGN PATENT DOCUMENTS

| L 19828 | 10/1955 | Fed. Rep. of Germany | 354/274 |
| 1326942 | 4/1963 | France | 354/271.1 |
| 1454669 | 11/1976 | United Kingdom | 354/230 |

*Primary Examiner*—A. A. Mathews
*Attorney, Agent, or Firm*—Toren, McGeady & Associates

[57] ABSTRACT

A diaphragm device including a pair of diaphragm blades movable in opposite directions relatively to each other along a moving line passing through an optical axis of an optical system characterized in that each of the diaphragm blades is provided with an opening of a shape consisting of combination of an arc having a center of curvature located on said moving line and at least one arc having a radius smaller than the above-mentioned arc and having a center of curvature located on said moving line or on a line at right angle to said moving line.

3 Claims, 13 Drawing Sheets

FIG.6
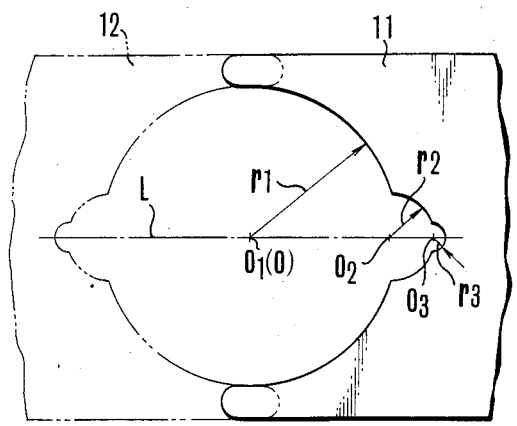
FIG.7(a)
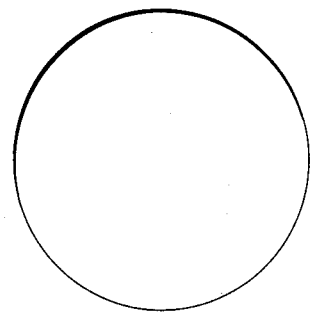
FIG.7(b)     FIG.7(c)
    

FIG.11
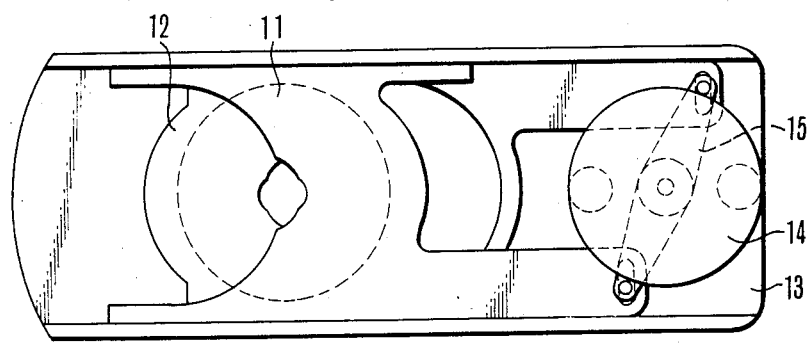
FIG.12(a) FIG.12(b)
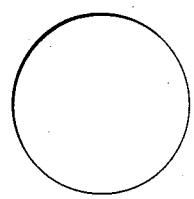 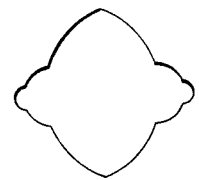
FIG.12(c) FIG.12(d)
 
FIG.12(e)

DIAPHRAGM DEVICE

BACKGROUND OF THE INVENTION

1. Field of the Invention

The present invention relates to a diaphragm device for use in cameras, such as single-lens reflex camera, lens-shutter camera, video camera, electrostatic still camera or the like.

2. Description of the Related Art

A diaphragm device is used to change an area of an aperture of an optical system in order to adjust quantity of incident light passing into the optical system. From an idealistic viewpoint it is most preferable that the aperture of the diaphragm has a circular shape. This is because out-of-focus state of an image formed through the circular aperture is uniform in all directions and because the circular aperture has minimum proportion of its circumferential length to its area, so that the image is most insusceptible to influence of diffraction. Such circular aperture can be formed by an iris diaphragm having increased number of diaphragm blades. However the cost for manufacturing the diaphragm is expensive and it is difficult to produce such diaphragm at low cost.

With the object of obtaining the diaphragm at low cost, several types of diaphragm having only two diaphragm blades have been proposed. FIG. 1 shows an example of the diaphragm of this kind, in which one of the diaphragm blades has an opening of tadpole shape, including a circular portion of maximum diameter and a tail-like portion extending from a part of the circular portion. FIG. 2 shows another example of the diaphragm of this kind, in which each of the diaphragm blades has an opening of partial square shape. FIG. 3 shows a further example of the diaphragm of this kind in which each of the diaphragm blades has an opening of the shape including a semi-circular portion of maximum diameter and a semi-hexagonal portion extending from a part of said semi-circular portion.

These diaphragm devices have defects as explained below.

The diaphragm device as shown in FIG. 1 is a center-position changing diaphragm in which the center of the aperture area of the diaphragm continually changes its position as the diaphragm is operated.

The diaphragm as shown in FIG. 2 always holds its aperture in the form of a square, so that the center of the aperture area does not change its position.

However, when the image is in out-of-focus state it is deformed in only two directions, owing to the existence of only two tangential directions and, furthermore, the out-of-focus image of a point source is deformed into a square shape, which looks strange.

According to the construction as shown in FIG. 3, the aperture takes the form of rugby-ball, at an intermediate state of the aperture closing prcess, which has a large length-breadth ratio, so that there is substantial difference in degree of defocussing depending upon the direction. Furthermore, the shape of the aperture constantly varies according to the opening size of the diaphragm, so that it is impossible to produce a good image.

Particularly in the case where it is desired to produce a soft-focus effect or an intentional out-of-focus effect at peripheral portion of a picture, it has been difficult to attain such effects uniformly at the peripheral portion of the picture, for example in the breadthwise and vertical directions of the picture.

FIGS. 4 and 5 illustrate another example of the conventional diaphragm device including a pair of diaphragm blades which are movable in opposite directions relatively to each other along a common moving line to control the aperture diameter of the diaphragm. In these figures, 1 is a driving motor for driving the diaphragm blades, 2 is a blade driving lever fixedly connected to the output shaft of said driving motor and having blade driving pins mounted thereon to drive the diaphragm blades, 3 is a base plate slidably supporting the diaphragm blades thereon, and 4 and 5 are the diaphragm blades for adjusting the quantity of light passing through an objective. These diaphragm blades are slidably held on said base plate and connected by the pins to said blade driving lever 2. The diaphargm blades 4 and 5 have cut portions 4a and 5a, respectively, which cooperate to form a diaphragm aperture.

These diaphragm blades 4 and 5 are arranged to be movable in parallel toward or away from each other along a common straight line on a plane at right angle to the optical axis of the photographing lens. Thus the motor 1 serves to rotate the blade driving lever 2, which drives the diaphragm blades 4 and 5 trough the blade driving pins to cause parallel movement of said diaphragm blades.

FIG. 5 shows the fully opened state of the diaphragm device, where the larger diameter portions of the cut portions 4a and 5a come into alignment with each other to open the full diameter of the lens.

In operation of the diaphragm, a voltage signal is fed from a voltage source (not shown) to the driving motor 1. The blade driving lever 2 fixedly connected to the output shaft of the motor 1 is rotated thereby, and the diaphragm blades 4 and 5 connected to said blade driving lever 2 through the pins are moved in opposite directions along the common straight line.

Thus the opening area of the aperature formed by the cut portions 4a and 5a of the diaphragm blades 4 and 5 is decreased until the opening area reduces to its minimum diameter.

According to the conventional diaphragm device as described above, the aperture formed by the diaphragm blades 4 and 5 has a square shape having two sides formed by one of the diaphragm blades and other two sides formed by the other diaphragm blade. Although this type of the diaphragm device produces a satisfactory image when it is in in-focus state, it has a defect as explained above with reference to FIG. 2. That is, when the image is in out-of-focus state, the image of a point source is deformed into a square shape, owing to the square luminons flux. A square shape is in line symmetry and, consequently, an out-of-focus image is deformed in two directions only, and thus a very poorly deformed image is produced.

SUMMARY OF THE INVENTION

It is a first object to provide a diaphragm device in which the defects as described above are removed and optimum shapes of aperture opening of the diaphragm for attaining intentional out-of-focus states can be produced at a plurality of stages of the aperture opening size.

In order to attain such object, the present invention provides a diaphragm device including a pair of diaphragm blades movable in opposite directions relatively to each other along a common moving line passing through an optical axis of an optical system, in which each diaphragm blade has an opening having a peripheral shape consisting of a plurality of arcs which have gradually smaller radius of curvature and gradually shifted centers of curvature on said common moving line.

It is a second object of the invention to provide a diaphragm device in which the out-of-focus effect having no directional difference on an image can be produced.

If the diaphragm blade having the shape as described above is used to attain the above-mentioned first object, the shape of the aperture opening varies as shown in FIGS. 12(a), 12(b), 12(c), 12(d) and 12(e), at the successive stages of the aperture opening size of the diaphragm as the diaphragm blades are moved in opposite directions to each other. Referring to these figures, FIG. 12(a) shows the maximum opening state, FIG. 12(e) shows the minimum opening state, and FIGS. 12(b)–13(d) show the intermediate opening states, respectively, wherein FIG. 12(d) shows the state which substantially corresponds to the commonly used opening state. As is clear from these figures, the opening state having circular shape or substantially circular shape is obtained at the three aperture opening sizes including the maximum opening size (a), the commonly used opening size (d) and the minimum opening size (e). However, in the commonly used opening state, that is, the most frequently used state (d), the lengthwise size is different from the breadthwise size, so that "difference in out-of-focus state" is caused, according to lengthwise and breadthwise directions. This is the problem in the diaphragm device which is directed to attain the first object.

The second object of the present invention resides in avoiding such problem in the diaphragm device which aims at attaining the first object and providing a diaphragm device including a pair of diaphragm blades having such opening shapes that a circular or substantially circular opening can be formed at a plurality of sizes of aperture opening and its length-to-breath ratio is approximately equal to one at all times.

It is a third object of the present invention to provide a diaphragm device which is suitable to drive the diaphragm blades which attain the first and second objects as described above.

It is a fourth object of the present invention to provide an improvement in a diaphragm device including a plurality of diaphragm blades movable along a straight line to form an aperture opening which attains the first, second and third objects as described above, characterized by the fact that said diaphragm device includes a plurality of diaphragm blades relatively movable in parallel with each other along a common straight line, which are so arranged that the aperture opening formed by these diaphragm blades varies its size, while holding its similar five or more cornered polygonal shape, until it reaches at its minimum aperture opening size, except when the diaphragm blades are positioned in the fully opened state.

It is a fifth object of the present invention to provide a diaphragm device including two or more diaphragm blades movable relatively to each other along a common straight line to form an aperture opening which is variable from its maximum size to its minimum size, wherein the construction of the diaphragm device can be made to be compact as compared with the conventional construction.

BRIEF DESCRIPTION OF THE DRAWINGS

FIGS. 6 to 11 illustrate a first embodiment of the present invention in which:

FIG. 6 shows the shape of the diaphragm blade;

FIGS. 7(a), 7(b) and 7(c) show the successive states of the diaphragm aperture opening as the diaphragm blades are moved relatively to each other;

FIG. 8 is a plan view of the diaphragm device in its fully opened state;

FIG. 9 Illustrates the respective diaphragm blades;

FIG. 10 is a sectional view taken along a line A—A in FIG. 8; and

FIG. 11 is a plan view of the diaphragm device in its closed state.

FIGS. 12 to 15 illustrate a second embodiment of the present invention in which:

FIGS. 12(a), 12(b), 12(c), 12(d) and 12(e) show the successive states of the diaphragm aperture opening formed by the diaphragm blades;

FIG. 13 illustrates the shape of the aperture opening formed by the diaphragm blades;

FIG. 15 illustrates a modified form of the diaphragm blade.

FIGS. 16 to 23 illustrate a third embodiment of the present invention in which:

FIG. 16 is a side view of the diaphragm device;

FIG. 17 is an exploded perspective view;

FIG. 18 is a plan view; and

FIGS. 19, 20 and 21, 22 and 23 illustrate the successive steps of the operation of the diaphragm device.

FIGS. 24 to 28 illustrate a fourth embodiment of the present invention in which:

FIG. 24 is a side view of the diaphragm device;

FIG. 25 is an exploded perspective view; and

FIGS. 26, 27 and 28 illustrate the successive steps of the operation of the diaphragm device.

DETAILED DESCRIPTION OF THE PREFERRED EMBODIMENTS

Now the preferred embodiments of the present invention will be explained with reference to the accompanying drawings.

FIGS. 6 to 11 illustrate a first embodiment of the present invention.

Before explaining the detailed mechanism of the present invention, a description will be given to the fundamental construction.

Referring to FIG. 6, the diaphragm device includes a pair of diaphragm blades 11 and 12, which are movable at equal amounts in opposite directions relatively to each other along a moving line or line of movement which passes through an optical axis O of an optical system (not shown). The diaphragm blades move on the line of movement. A cut opening portion is formed in each of the diaphragm blades and these cut opening portions cooperate to form an aperture opening. The cut opening portion formed in the blade 11 is symmetrical to that formed in the blade 12. Accordingly, a detailed description will be given to the diaphragm blade 11 only.

Firstly, a first circle is described which has a radius of curvature r1 corresponding to the maximum size of the aperture opening of the diaphragm and a first center of curvature $O_1$ located on the optical axis O. Then, a second center of curvature $O_2$ of a second circle having radius r2 corresponding to the commonly used aperture opening of the diaphragm is determined at a position where the length of a straight line connecting two intersection points of the first circle of radius r1 and the second circle of radius r2 is equal to the diameter of the second circle of radius r2 or at a position nearer to the optical axis O by a length shorter than half of said radius r2. Then, a third center of curvature $O_3$ of a third circle having radius r3 is determined on the moving line or line of movement L in the same manner as in the determination of the second circle of radius r2.

Figure 9:
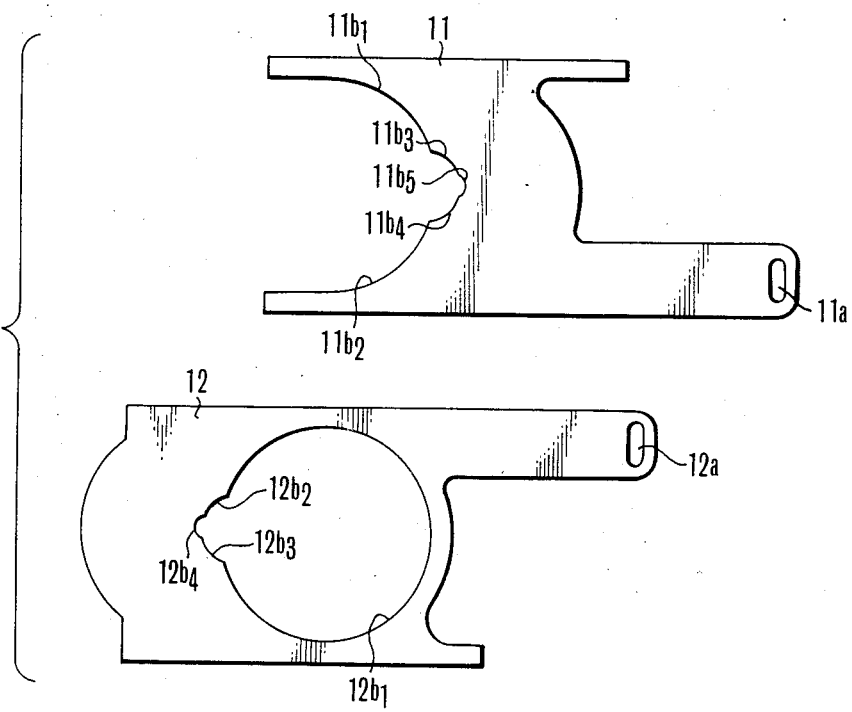

The diaphragm blade 11 is formed with a cut portion 11b which is open at its one end and closed at its other end by a continuous periphery consisting of five arcuate portions including two arcuate portions $11b_1$ and $11b_2$ having radius r1, two arcuate portions $11b_3$ and $11b_4$ having radius r2 and one arcuate portion $11b_5$ having radius r3, as shown in FIG. 9.

The other diaphragm blade 12 is formed with a cut portion 12b which cooperates with the cut portion 11b to form the aperture opening. The cut portion 12b has a continuous periphery consisting of a circle $12b_1$ having radius r1, arcuate portions $12b_2$ and $12b_3$ having radius r2 and an arcuate portion $12b_4$ having radius r3, as shown in FIG. 9.

FIGS. 7(a), 7(b) and 7(c) illustrate three representative exposure states of the aperture opening which are formed by the two diaphragm blades having the cut portions as explained above when they are moved relatively to each other. FIG. 7(a) shows the maximum opening state. In FIG. 7(a), the arcuate portions of radius r2 and r3 are not observed, because the part of the cut portion of one of the diaphragm blades projecting outwardly of the maximum radius opening is concealed by the circular portion of the cut portion of the other diaphragm blade. FIG. 7(b) shows the state corresponding to the commonly used aperture opening, where the opening can be assumed to be substantially circular. FIG. 7(c) shows the minimum opening state, where the opening is circular.

Now, the embodiments of the present invention including a driving mechanism for driving the diaphragm blades will be explained.

FIGS. 8 to 11 illustrate the first embodiment of the present invention.

Figure 8:
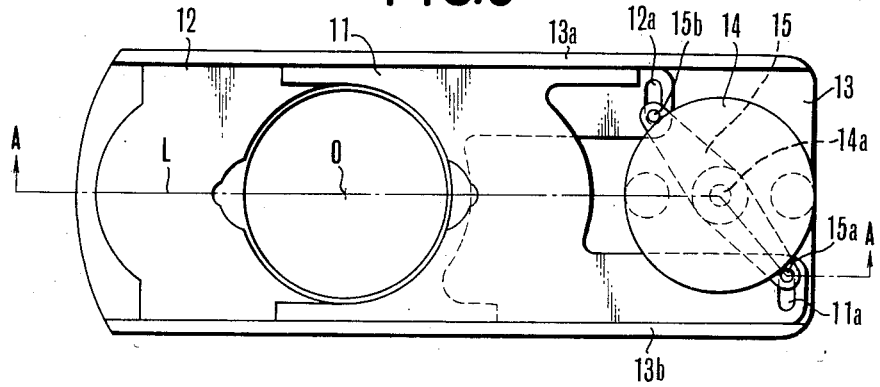

Referring to FIG. 8, the diaphragm blades 11 and 12 have cut portions having the shapes as explained above. In the illustrated embodiment, the diaphragm blades 11 and 12 have actual shapes, as shown in FIG. 9, which facilitate assembling of these diaphragm blades into the diaphragm device. The diaphragm blades 11 and 12 are formed with portions which project from parts of the blades, respectively, and slots 11a and 12a are formed in the projecting portions, respectively. The both diaphragm blades 11 and 12 engage with sliding rails 13a and 13b formed on upper and lower sides of a supporting base plate 13, so that the diaphragm blades are slidable on the base plate along a moving line L, which is a straight line.

Figure 10:
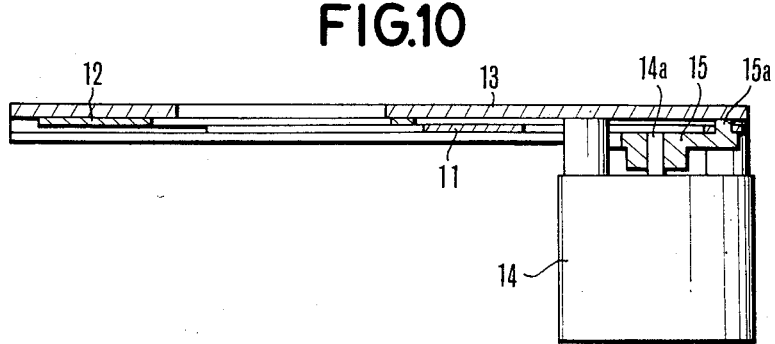

A driver 14, for example a driver using a meter, is fixedly mounted on the base plate 13. The driver 14 is controlled by an electric control circuit (not shown) to control the angle of rotation of its output shaft 14a. A driving arm 15 is fixedly connected at its central portion to the output shaft 14a and said driving arm has driving pins 15a and 15b formed on the respective ends thereof. The driving pin 15a is shown in FIG. 10 which is a sectional view taken along a line A—A in FIG. 8.

The driving pin 15a loosely fits in the abovementioned slot 11a formed in the diaphragm blade 11, while the driving pin 15b loosely fits in the slot 12a formed in the diaphragm blade 12. Accordingly, when the driving arm 15 is rotated, the driving pins 15a and 15b push the edges of the slots 11a and 12a, respectively, so that the diaphragm blades 11 and 12 make sliding movements in opposite directions to each other.

According to the construction as described above, when the driver 14 is actuated to rotate the driving arm 15 to a desired angle to cause relative movements of the diaphragm blades 11 and 12 in opposite directions, the cut portions of the diaphragm blades 11 and 12 are moved toward or away from each other to produce an aperture opening corresponding to a desired F-value. FIG. 11 shows the state where the diaphragm blades have been moved to form an aperture opening smaller than the commonly used aperture opening.

Figure 1:
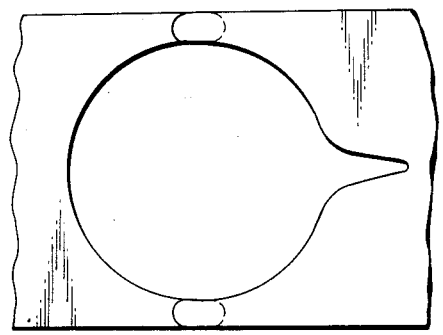
FIGS. 1 to 5 illustrate several diaphragm devices according to prior arts.
Figure 2:
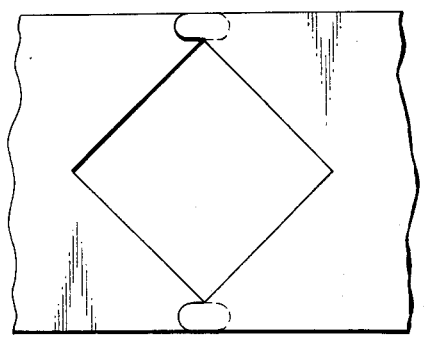
Figure 3:
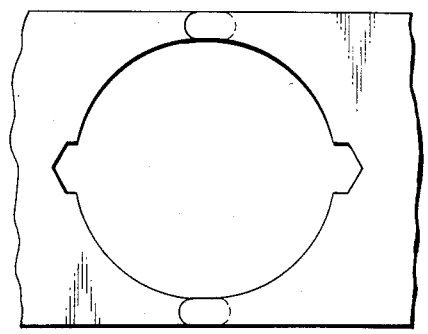
Figure 4:
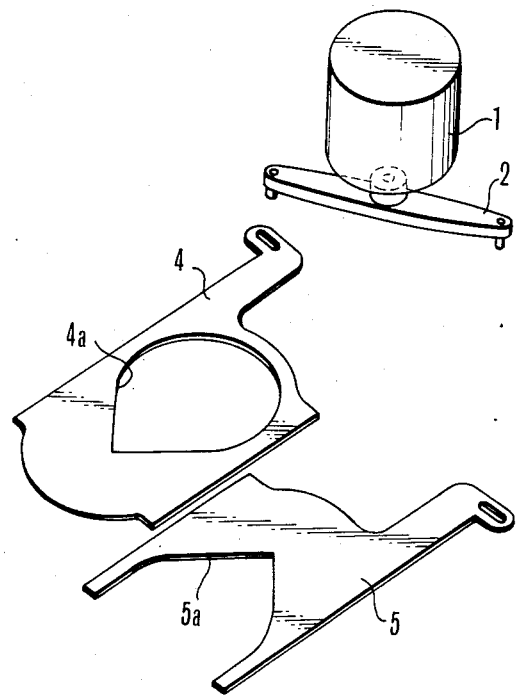
Figure 5:
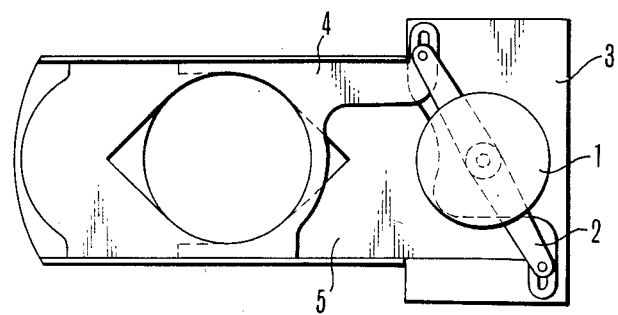

Although it is described with reference to the illustrated embodiment that the periphery of the cut portion formed in the diaphragm blade consists of three different types of arcuate portions, it may be possible to form the periphery of the cut portion by combination of four, five or more types of arcuate portions. It is to be noted, however, that as the number of types of arcuate portions is excessively increased, the final shape of the opening becomes similar to the shape as shown in FIG. 2. Accordingly, the maximum number of types of arcuate portions to be combined to form one cut portion may be five, in practice.

In case where the second center of curvature is determined at the position nearer to the optical axis than the position where the distance between the intersection points of the first circle and the second circle is equal to the diameter of the second circle, the aperture opening takes a form which is a little deformed in the lengthwise direction from a circular form but it is possible to somewhat reduce the moving stroke of the diaphragm blade. It is to be noted, however, that if the second center of curvature is determined at the position excessively near to the optical axis, the final shape of the opening becomes similar to a circle. Accordingly, it is preferrable, in practice, that the amount of bringing the second center of curvature nearer to the optical axis is limited to substantially half of the radius of the second circle.

It is possible to use, in place of the circular form, an elliptical or parabolic shape having a radius of curvature similar to that of the circular form. It is also possible to use, in place of the straight moving line, an arcuate moving line. In such case, the diaphragm blade is rotated around a center of rotation.

The embodiment as described above provides a diaphragm device which is simple in construction and yet produces such advantages that aperture openings having substantially circular shape can be formed at a plurality of stages of opening diameter of the diaphragm and, particularly, a highly faithful image or a fine out-of-focus image can be obtained at a frequently used opening diameter of the diaphragm.

FIGS. 12 to 15 illustrate the second embodiment of the present invention which aims at attaining the second object of the invention as mentioned above.

When the diaphragm blade as shown in FIG. 6 is used, difference is caused between the lengthwise size and the breadthwise size of the aperture opening at the time of commonly used opening state, as explained above. This is due to the arrangement of the diaphragm in which a plurality of arcuate portions 21a, 21b and 22a, 22b are combined and arranged on the moving line X which passes through the optical axis (see FIG. 13). Accordingly, the length-to-breath ratio approximately equal to one can be obtained by forming additional arcuate portions on a line at right angle to the moving line X.

Figure 13:
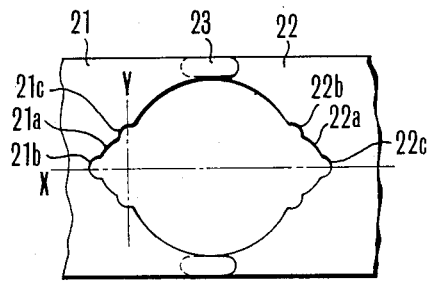

In the embodiment as shown in FIG. 13, additional arcuate portions 21c and 22c having minimum radius are formed in the diaphragm blades 21 and 22, respectively, on a line Y at right angle to the moving line X.

Figure 14A:
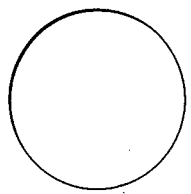
FIGS. 14(a), 14(b), 14(c), 14(d) and 14(e) show the successive states of the diaphragm aperture opening formed by the diaphragm blades.
Figure 14B:
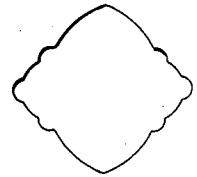
Figure 14C:
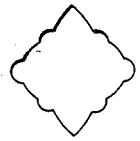
Figure 14D:
Figure 14E:

According to the embodiment as shown in FIG. 13, the aperture opening shapes as shown in FIGS. 12(b), 12(c) and 12(d) at the intermediate diaphragm closing steps are modified to the shapes as shown in FIGS. 14(b), 14(c) and 14(d). Thus, the shape of the aperture opening at the time of the commonly used diaphragm opening state becomes similar to a circular shape and the length-to-breadth ratio becomes substantially equal to one. Thus the second object can be attained.

Although the additional arcuate portion 21c on the line Y at right angle to the line X is shown as a portion having same radius as that of the arcuate portion 21b of minimum radius, said additional arcuate portion may have a different radius from that of the arcuate portion 21b. The arcuate portion, of course, may be formed in the shape other than the precisely circular shape.

Figure 15:
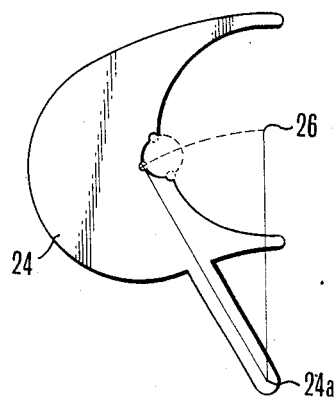

Although two diaphragm blades are shown as horizontally slidable to change the aperture opening size in the embodiment as described above, each diaphragm blade may be pivotally mounted so that it makes angular movement. FIG. 15 illustrates such modification of the diaphragm blade. A diaphragm device wherein a diaphragm blade 24 is rotatable around a supporting axis 24a to move along a rotating path 26 including the optical axis, as shown in FIG. 15, to change the size of the aperture opening has been publicly known in the art, and the present invention can be applied to such type of diaphragm device to attain the desired effect.

The second embodiment of the present invention as described above provides a diaphragm device in which the aperture opening having the shape similar to circular shape can be obtained at a plurality of stages of the aperture opening sizes and the aperture opening having length-to-breadth ratio substantially equal to one can be produced, by properly selecting the shape of the cut opening portion formed in the diaphragm blades of the two-blades type diaphragm device which is simple in construction and which can be manufactured at low cost.

FIGS. 16 to 23 illustrate the third embodiment of the present invention which aims at attaining the fourth object as described above.

Figure 16:
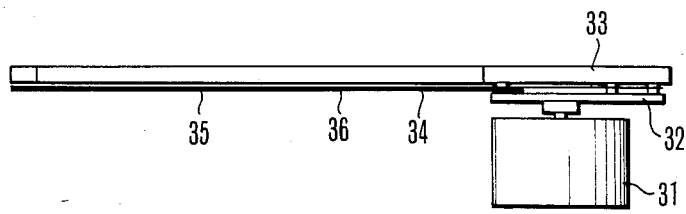
Figure 17:
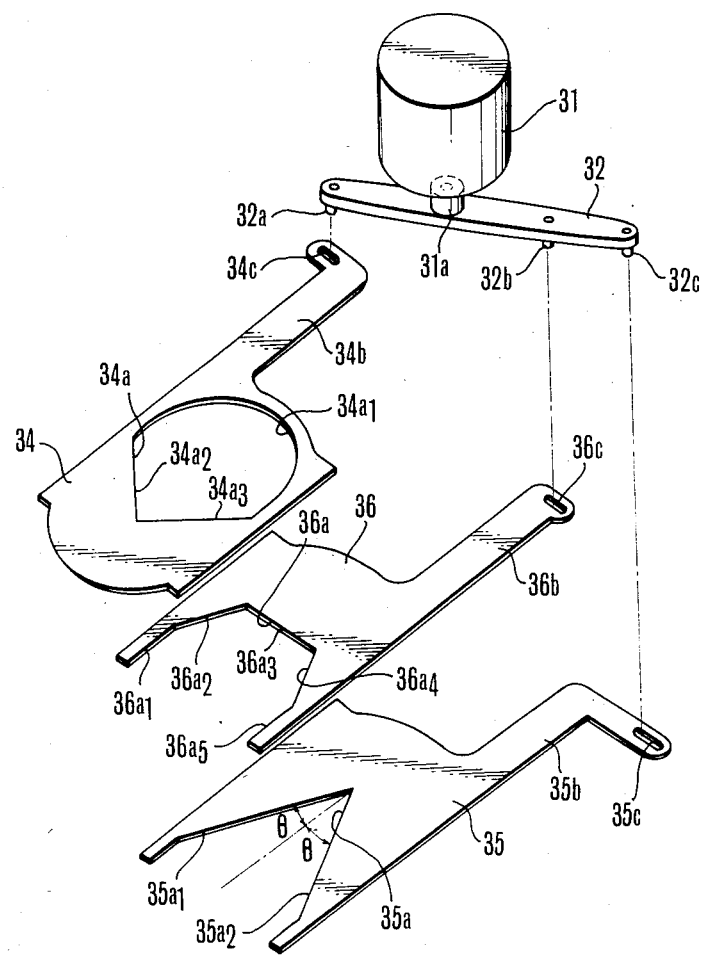

FIG. 16 is the side view and FIG. 17 is the exploded perspective view. In these figures, 31 is a driving motor having an output shaft 31a which constitutes a driving source for drving diaphragm blades, 32 is a blade driving lever fixedly connected to the output shaft 31a of the driving motor 31 and having blade driving pins mounted thereon, and 33 is a base plate on which the diaphragm blades are slidably supported.

The diaphragm blades for adjusting the quantity of light passing into a photographing lens include first and second blades 34 and 35 and, in addition thereto, a third auxiliary blade 36. The blade driving lever 32 has pins 32a and 32c formed on the both ends thereof and these pins engage with slots 34c and 35c formed at ends of arms 34b and 35b of the diaphragm blades 34 and 35, respectively. The blade driving lever 32 has another pin 32b which engages with a slot 36c formed at an end of an arm 36b of the third blade 36.

The diaphragm blades 34, 35 and 36 have aperture forming cut portions 34a, 35a and 36a formed in these blades, respectivly. The diaphragm blades 34 and 35 are arranged to be movable in parallel with each other along a common straight line on a plane at right angle to the optical axis. The auxiliary diaphragm blade 36 is arranged to be movable along said common straight line on the same plane with said diaphragm blades 34 and 35.

The pins 32a, 32c and 32b of the driving lever 32 engage with the slots 34c, 35c and 36c formed at the ends of the arms 34b, 35b and 36b of the first, second and third diaphragm blades, respectively, so that the moving strokes of these diaphragm blades are controlled according to the distances between the respective pins 32a, 32b and 32c and the center of rotation of the driving lever 32, respectively.

The aperture forming cut portion 34a of the first diaphragm blade 34 is a closed opening formed of a substantially semi-circular part $34a_1$, and straight parts $34a_2$ and $34a_3$ which connect a point on the moving line of the diaphragm blades and the ends of said semicircular part $34a_1$, respectively. The aperture forming cut portion 35a of the second diaphragm blade 35 is an opening which opens at its one end and has cut parts $35a_1$ and $35a_2$ flaring at equal angles from a point on the moving line of the diaphragm blades.

The third blade is arranged between the first and second blades and has a cut portion including polygonal cut parts $36a_1$–$36a_5$.

Figure 18:
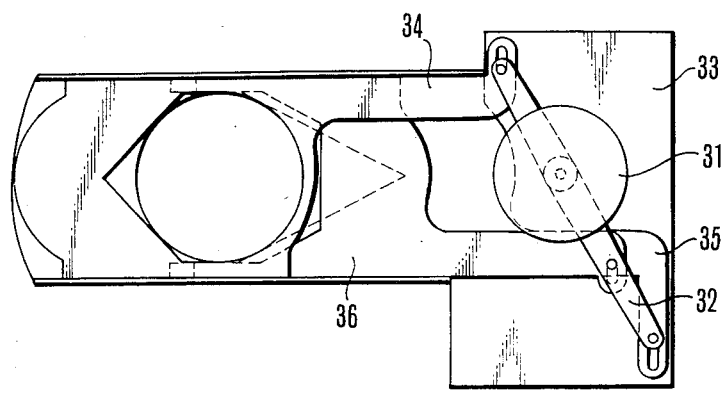

FIG. 18 shows the fully open state of the diaphragm device, where the larger diameter parts of the cut portions 34a, 35a and 36a of the diaphragm blades 34, 35 and 36 substantially coincide with each other to provide the lens with a fully opened aperture.

Figure 19:
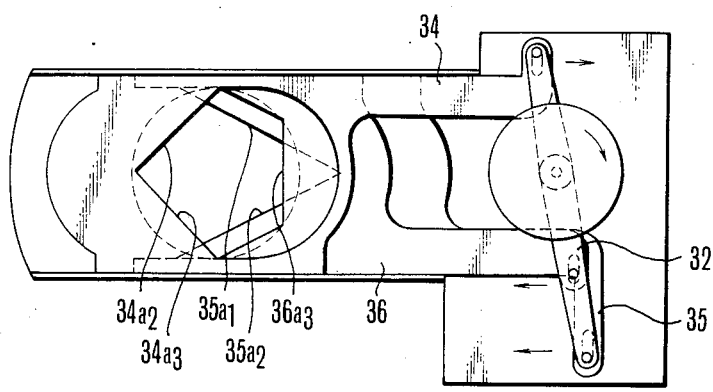
Figure 20:
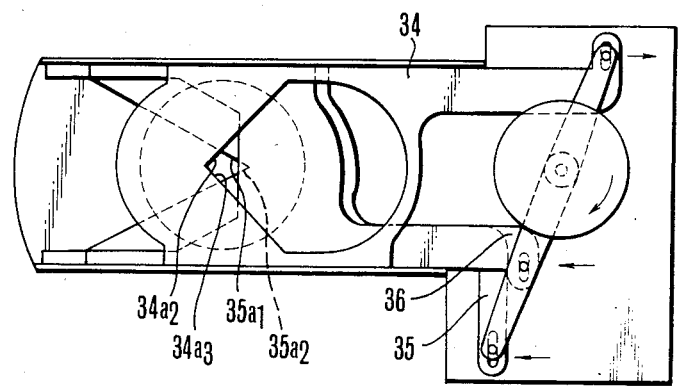

In operation of the diaphragm, a voltage signal is fed to the driving motor 31, thereby rotating the motor. The blade driving lever 32 connected to the output shaft of the driving motor 31 is rotated, so that the diaphragm blades 34, 35 and 36 connected to the blade driving lever 32 by the pins respectively distant from the center of rotation of the lever are slidingly moved along the common straight line in the respective directions with different relative moving rates. Accordingly the area of the aperture opening is gradually reduced, so that the diaphragm is operated until the diaphragm becomes into the state as shown in FIG. 19. This is the state a little closed from the fully opened state and the opening has a pentagonal shape including two sides formed by the diaphragm blade 35 having largest rate of relative movement, two sides formed by the diaphragm blade 34 having smaller rate of relative movement and one side formed by the diaphragm blade 36 having smallest rate of relative movement and moving in the same moving direction as that of the diaphragm blade 35 having largest rate of relative movement. When the driving motor 31 is further rotated from this state so that the blade driving lever 32 is rotated, the diaphragm blades come to the positions as shown in FIG. 20. Thus the aperture opening is closed to its smallest size, while holding its similar pentagonal shape. Ideally speaking, it is preferrable to hold the aperture opening in a regular pentagonal shape, in which it is preferred to hold the following relation between the strokes (rates of relative movement) of the diaphragm blades.

A:B=1:0.809 A:C=1:2.618

If it is not necessary to form the aperture opening in a shape close to a regular pentagonal shape, it may be possible to hold such simple relation as A:B=1:1.

Figure 21:
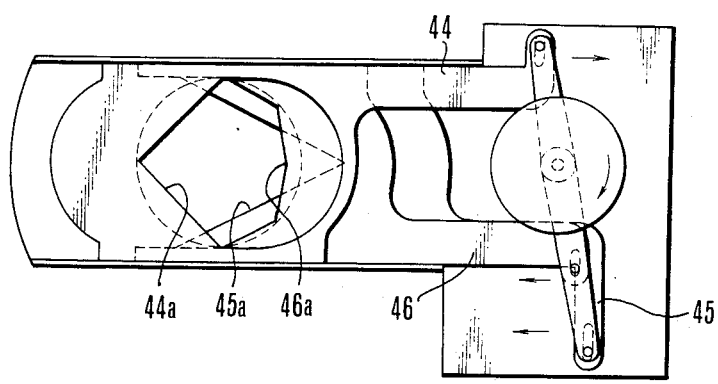
Figure 22:
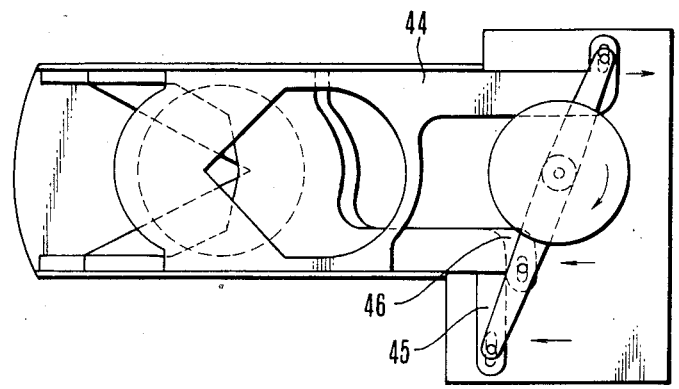
Figure 23:
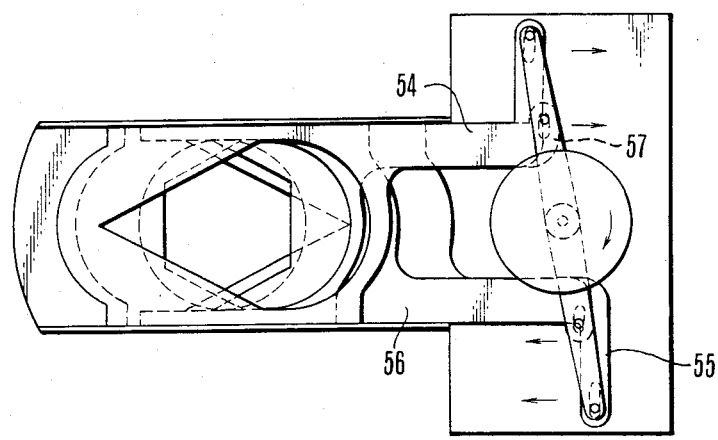

FIGS. 22 and 23 illustrate a modified form of the diaphragm device according to the present invention. This modified form includes three diaphragm blades 44, 45 and 46 having aperture forming cut portions 44a, 45a and 46a, as in the embodiment shown in FIGS. 16-20. According to this modified form, however, the diaphragm blade 46 having smallest rate of relative movement is formed with a cut portion 46a in which an angled cut is formed, so that the aperture opening formed by the cut portions of the three diaphragm blades takes a hexagonal shape. FIGS. 21 and 22 show the successive steps of the diaphragm closing process.

FIG. 23 illustrates a further modified form, in which the diaphragm blades include two main diaphragm blades 54 and 55 and, in addition thereto, two auxiliary diaphragm blades 56 and 57, so that a hexagonal aperture opening is formed by these main and auxiliary diaphragm blades.

The embodiments as described above with reference to FIGS. 16-23 provides a diaphragm device which includes two main diaphragm blades and, in addition thereto, at least one auxiliary diaphragm blade which has a cut portion of the shape different from the shapes o the cut portions of the main diaphragm blades and which has a rate of relative movement different from those of the main diaphragm blades, whereby an aperture opening can be formed, while holding its similar five or more cornered polygonal shape until the aperture opening is reduced to its smallest size, except when the aperture opening is fully opened.

FIGS. 24-28 illustrate the fourth embodiment of the present invention which aims at attaining the fifth object as mentioned above. This embodiment provides a diaphragm blade driving device in a diaphragm device including a plurality of diaphragm blades movable in parallel relative to each other along a common straight line at right angle to the optical axis, characterized in that said diaphragm blade driving device comprises a driving source having an output shaft for driving the diaphragm blades, a blade driving lever which is rotatable about a center of rotation to cause parallel movements of the diaphragm blades, and a lever driving arm fixedly connected to the output shaft of the driving source to transmit the rotation of said output shaft to said diaphragm driving lever, wherein the center of rotation of said blade driving lever and the center of rotation of said lever driving arm are arranged in positions so offset that the angle of rotation of the blade driving lever is larger than the angle of rotation of the lever driving arm.

In these figures, 60 is a driving motor which constitutes a driving source for driving the diaphragm blades, 61 and 62 are diaphragm blades for adjusting quantity of light passing into a photographing lens which are movable in parallel relatively to each other along a common line on a plane at right angle to the optical axis of said photographing lens, 61a and 62a are aperture forming cut portions formed in the diaphragm blades, respectively, and 63 is a base plate on which the diaphragm blades are slidably mounted.

In order to cause parallel movements of the diaphragm blades 61 and 62 on the base plate 63 by rotating the driving motor 60, a blade driving lever 64 and a lever driving arm 65 are provided. The blade driving lever 64 is pivotally mounted on the base plate 63 so that the blade driving lever 64 is rotatable around a center of rotation 66. Blade driving pins are mounted on the ends of the blade driving lever 64, and said driving pins slidably engage in slots formed in the diaphragm blades 61 and 62, respectively, to cause parallel movements of the diaphragm blades when the blade driving lever is rotated. The lever driving arm 65 is fixedly connected to the output shaft 67 of the driving motor 60 and its forward end engages with a pin mounted on the blade driving lever 64, to transmit the rotation of the output shaft of the driving motor to the blades driving lever.

Figure 26:
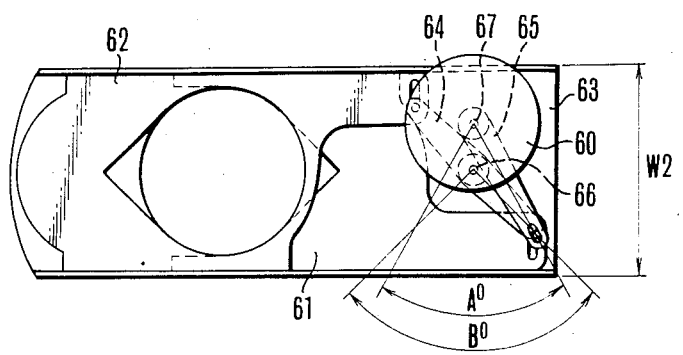

FIG. 26 shows the fully opened state of the diaphragm. In this state the larger diameter portions of the aperture forming cut portions 61a and 62a of the diaphragm blades 61 and 62 come into aligned relation to form a full open diameter of the lens.

Figure 27:
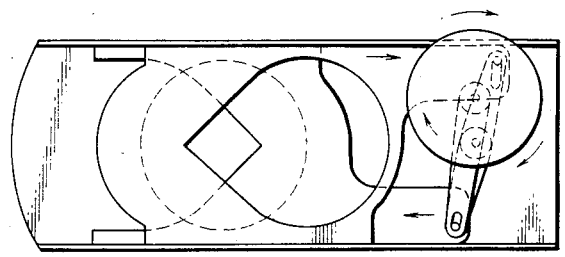

When a voltage signal is fed from a voltage source (not shown) to the driving motor 60, the output shaft 67 of the driving motor 60 is rotated. The output shaft 67 of the driving motor 60 is fixedly connected to the lever driving arm 65, which is connected at its forward end to the pin mounted on the blade driving lever 64, so that the rotating force is transmitted to the blade driving lever. When the blade driving lever 64 is rotated by the lever driving arm 65, the diaphragm blades 61 and 62, whcih engage with the pins of the blade driving lever 64 and slidably mounted on the base plate 63, are moved along the straight line on the plane at right angle to the optical axis, until the aperture opening formed by the cut portions 61a and 62a is closed, as shown in FIG. 27.

The center of rotation of the driving motor 60, namely, the output shaft 67 of the same, and the center of rotation of the blade driving lever are arranged in relatively offset positions and the distance between the pin and the center of rotation of the lever driving arm 65 is longer than that of the blade driving lever, so that the angle of rotation B° of the blade driving lever 64 is larger than the angle of rotation A° of the driving motor 60. Accordingly, it is possible to increase the angle of rotation of the blade driving lever, while holding constant angle of rotation of the driving motor 60. Therefore, it is possible to reduce the radius of the blade driving lever, namely, the distance between the pin and the center of rotation of the blade driving lever 64, while assuring the sliding strokes of the diaphragm blades from the diaphragm open state to the diaphragm close state. That is, it is possible to reduce the entire width of the diaphragm device, indicated by W2 in FIG. 26.

Figure 24:
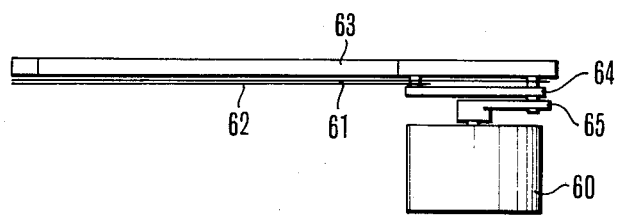
Figure 25:
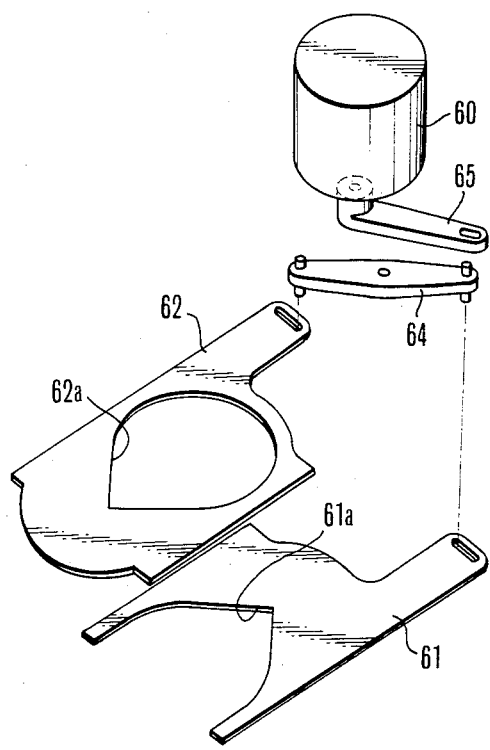
Figure 28:
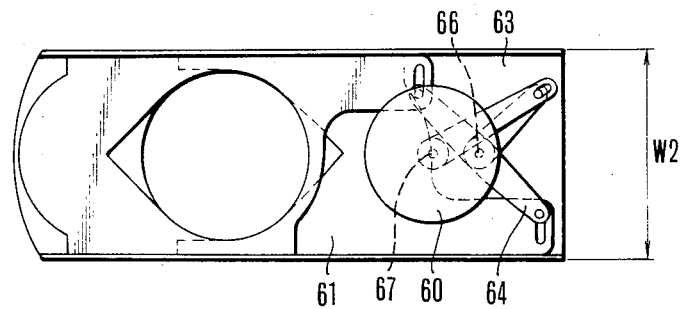

FIG. 28 illustrates a modified form of the present invention, in which the direction of offset of the centers of rotation is changed. In FIG. 28, the parts similar to those shown in FIGS. 24 and 25 are indicated by same numerals and the detailed explanations thereof are omitted. As is clear from the drawings, the direction of offset of the centers of rotation of the blade driving lever and the lever driving arm (the center of the output shaft of the driving motor) may be breadthwise direction of the diaphragm device as shown in FIG. 24 or lengthwise direction of the diaphragm device, as shown in FIG. 28, or it may be any other direction as desired.

According to the embodiment of the present invention as described above, a compact diaphragm mechanism can be produced owing to the arrangement in which the center of rotation of the blade driving lever and the center of rotation of the lever driving arm (the center of the output shaft of the driving motor) are located at offset positions. The offset direction can be easily changed, so that the layout of the other components required for the lenses, such as AF motor, PZ motor and the like is selected with high degree of freedom, and a compact construction of the lens unit as a whole can be produced.

What is claimed is:

1. A diaphragm device including two diaphragm blades arranged to be movable in parallel relatively to each other along a common line on a plane at right angle to an optical axis of an optical system and having aperture forming cut portions respectively, said diaphragm device further comprising at least one auxiliary diaphragm blade which is movable along said common line on the same plane as the above-mentioned diaphragm blades and has an aperture forming cut portion of the shape different shape from those of the above-mentioned diaphragm blades and amount of relative movement different from those of the above-mentioned diaphragm blades.

2. A blade driving device for driving diaphragm blades in a diaphragm device including a plurality of diaphragm blades movable in parallel relatively to each other on a common plane at right angle to an optical axis of an optical system, said blade driving device comprising a driving source for driving the diaphragm blades, a blade driving lever rotatable around its center of rotation to cause parallel movements of the diaphragm blades, a lever driving arm fixedly connected to the output shaft of said driving source and transmitting the rotation of said output shaft to said lever driving arm, in which the centers of rotation of said blade driving lever and said lever driving arm are arranged in such offset positions from each other that the angle of rotation of said blade driving lever is larger than the angle of rotation of said lever driving arm.

3. A diaphragm device comprising:
a first diaphragm blade,
a second diaphragm blade,
each of said first and second diaphragm blades combining to form an aperture opening having a plurality of arcuate portions havings centers of curvature located on a first straight line and at least two said arcuate portions having a different radius of curvature, and said aperture opening having a plurality of arcuate sections with the centers of curvature thereof located on a second straight line intersecting the first straight line at right angles, and
drving means for driving said first and second diaphragm blades along the first straight line toward and away from one another.

* * * * *